United States Patent [19]
Bedell, Jr.

[11] Patent Number: 5,952,568
[45] Date of Patent: Sep. 14, 1999

[54] COMBINATION GAS CAP AND DIGITAL TIRE PRESSURE GAUGE

[76] Inventor: Peter Bedell, Jr., 45 Filbert Ave., Sausalito, Calif. 94965

[21] Appl. No.: 09/176,004

[22] Filed: Oct. 20, 1998

[51] Int. Cl.[6] .................................................... B60C 23/02
[52] U.S. Cl. ........................................................ 73/146.5
[58] Field of Search ............................... 73/146.5, 146.8, 73/23; 200/303; 340/457; 114/343, 146.2–4

[56] References Cited

U.S. PATENT DOCUMENTS

| | | | |
|---|---|---|---|
| 4,033,170 | 7/1977 | Kawamura et al. | 73/23 |
| 5,168,751 | 12/1992 | Hwang | 73/146.8 |
| 5,451,927 | 9/1995 | Thompson | 340/457 |
| 5,452,819 | 9/1995 | Vance | 220/303 |
| 5,794,559 | 8/1998 | Graham | 114/343 |

Primary Examiner—Max Noori
Assistant Examiner—Abdullahi Aw-Musse
Attorney, Agent, or Firm—Woodbridge & Associates

[57] ABSTRACT

A combination gas cap and digital tire pressure gauge with a hollow bodied gas cap, a liquid crystal display showing through an opening in the top of the gas cap, a printed circuit board and support electronics located within the gas cap, a battery and battery door, a pressure transducer, and a push button and associated delay circuit to allow pressure reading to remain readable for ten seconds. The hollow bodied gas cap has a removable threaded portion at its lower end. The threaded portion is designed to mate with standard female threads of vehicle gas inlets. An alternate embodiment includes wherein a bayonet type locking portion that is substituted for the threaded portion.

10 Claims, 2 Drawing Sheets

COMBINATION GAS CAP AND DIGITAL TIRE PRESSURE GAUGE

BACKGROUND OF THE INVENTION

This invention relates generally to the field of air pressure gauges, and more particularly to a combination gas cap and digital tire pressure gauge.

Tire pressure gauges for measuring the pressure of vehicle tires are known. For many years these pressure gauges were a mechanical type in which the air pressure of the tire caused a post within the gauge to protrude outwards. The post has numerical indicators which correspond to tire pressure. Within the last twenty years a form of digital tire pressure gauge has been developed and is now common. In these devices a pressure transducer turns pressure into a voltage. The higher the pressure the greater the voltage. An electrical circuit then translates the voltage into a numerical reading which is shown on a Liquid crystal display.

Digital tire pressure gauges are generally comprised of a handle portion terminating in a pressure transducer portion. The electronics and the LCD as well as a battery are contained within the handle portion.

Although the digital tire pressure gauges available today are adequate for taking pressure readings on vehicle tires, the devices are not as easily accessable as they might be. They either are generally stored within the car or trucks glove compartment or in the vehicles trunk. In both cases the vehicle operator may have to waste valuable time in hunting for the tire pressure gauge amongst other unrelated items. This time delay may cause a vehicle operator to forego the pressure measuring activity which could then cause future accidents do to improper tire inflation.

SUMMARY OF THE INVENTION

The primary object of the invention is to provide a tire pressure gauge within the convenient location of a gas cap. The removal of the gas cap is essential every time the vehicle operator wants to fill the vehicle with gas. Most gas pump nozzles have a lever which allows the gas to pump without the need for the vehicle operator to continue to hold the gas activation trigger. This is a perfect opportunity to spend the time, while the gas is being pumped, to measure the air pressure of the vehicle's tires. The convenient location of the tire pressure gauge located within the gas cap makes this activity easy a nd spontaneous since the tire pressure gauge presents itself automatically upon removal of the gas cap from the vehicles gas inlet.

Other objects and advantages of the present invention will become apparent from the following descriptions, taken in connection with the accompanying drawings, wherein, by way of illustration and example, an embodiment of the present invention is disclosed.

A combination gas cap and digital tire pressure gauge comprising: a hollow bodied gas cap, a liquid crystal display showing through an opening in the top of the gas cap, a printed circuit board, support electronics, battery and pressure transducer located within the gas cap, a battery door, a push button and an associated delay circuit to allow pressure reading to remain readable for ten seconds The gas cap has a removable threaded portion at its lower end. The threaded portion is designed to mate with standard female threads of vehicle gas inlets. An alternate lower portion includes a bayonet type locking device designed to accommodate vehicles with bayonet type gas inlet designs. The lower portion, whether threaded or bayonet, also acts as a battery door.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
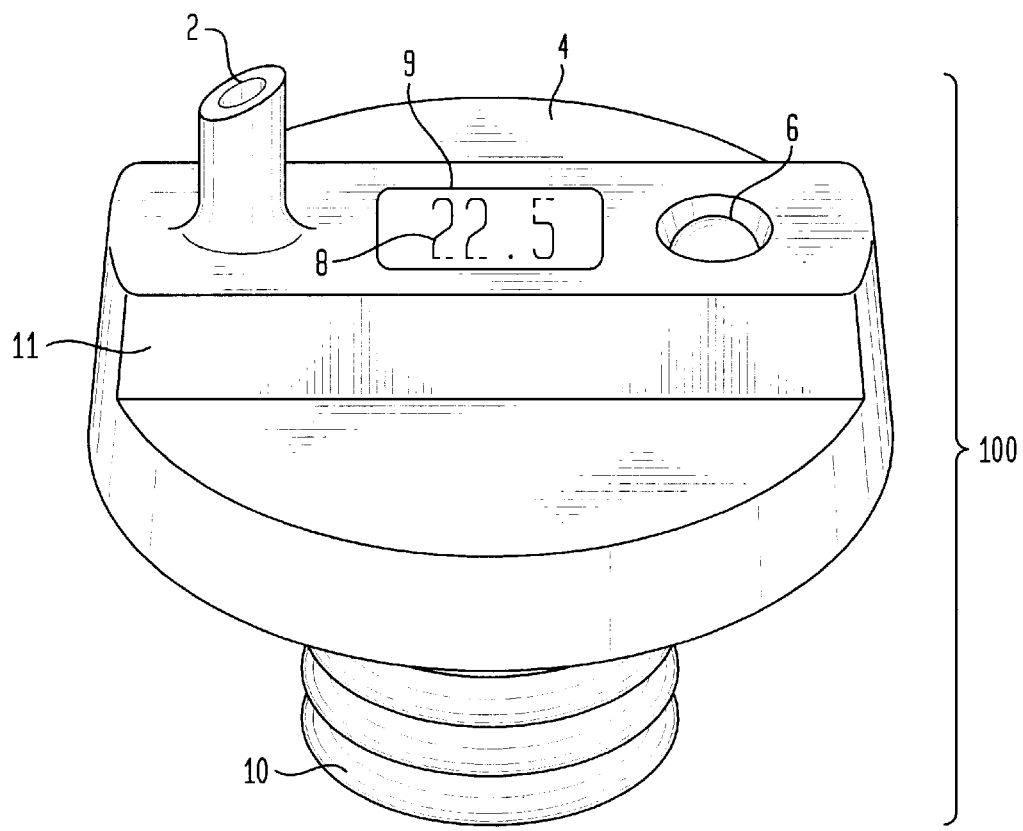
FIG. 1 is a perspective view of the combination gas cap and tire pressure gauge of the present invention.
Figure 4:
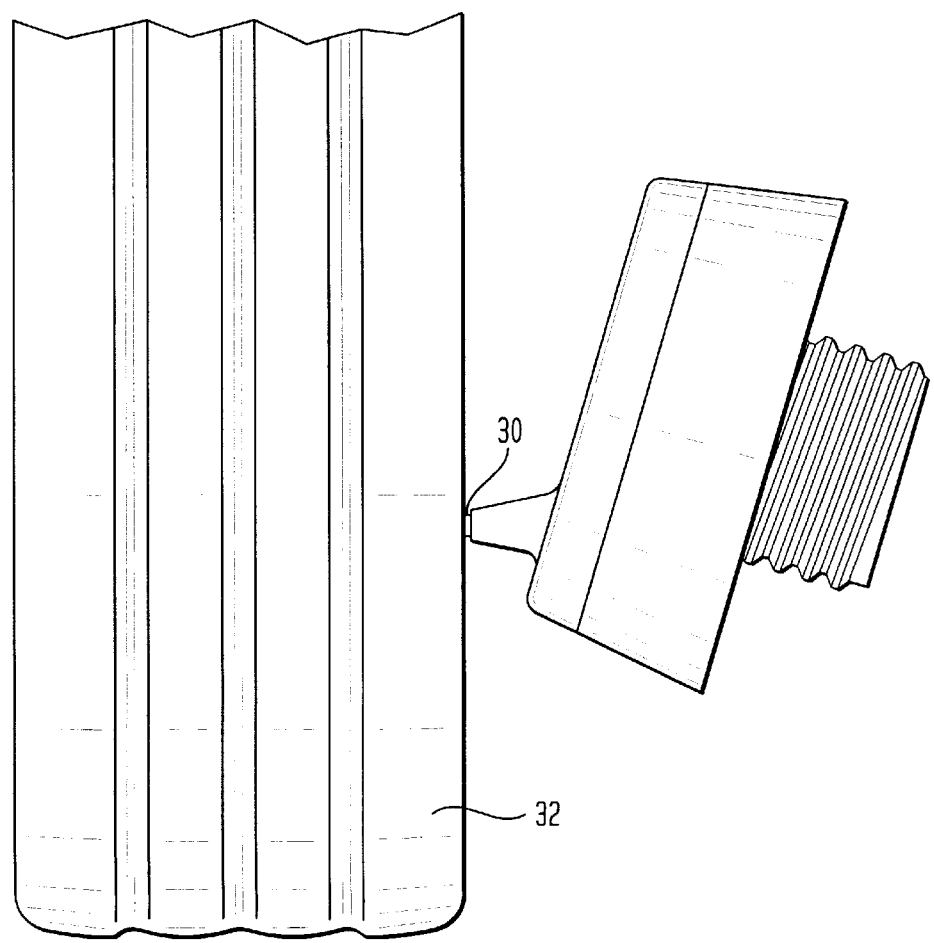
FIG. 4 is a perspective view of the combination gas cap and tire pressure gauge of the present invention in use.

Referring now to FIG. 1 we see the gas cap of the present invention 100 which has a digital tire pressure gauge built into it. Liquid crystal display 8 is seen through a cut out 9 in the top portion of the gas cap 100. The electronics are fit in the raised portion 11 of a the gas cap which also acts as a tightening and loosening means for threading the gas cap 100 into a mating gas inlet portion of a motor vehicle. Button 6 is pushed before a reading is taken. The user then mates pressure transducer portion 2 to the air inlet valve 30 of a vehicle tire 32 as shown in FIG. 4. The user then removes the combination gas cap and tire pressure gauge of the present invention 100 and looks at the liquid crystal display 8 which shows correct the tire pressure. An electronic circuit associated with the display 8 freezes the display for approximately ten seconds to allow the user time to read it. The display then returns to a blank state and is ready for the next tire pressure reading. This process is continued for the remainder of the tires on the vehicle. My experiments have shown that a person can easily take pressure measurements of his or her vehicles tires within the time typically associated with pumping a tank full of gas. Since most gas pumping devices have a mechanical lever which allows the pump to continue without the users attendance, it is an ideal time to perform the life saving function of checking the tire pressure of the users vehicle.

Figure 2:
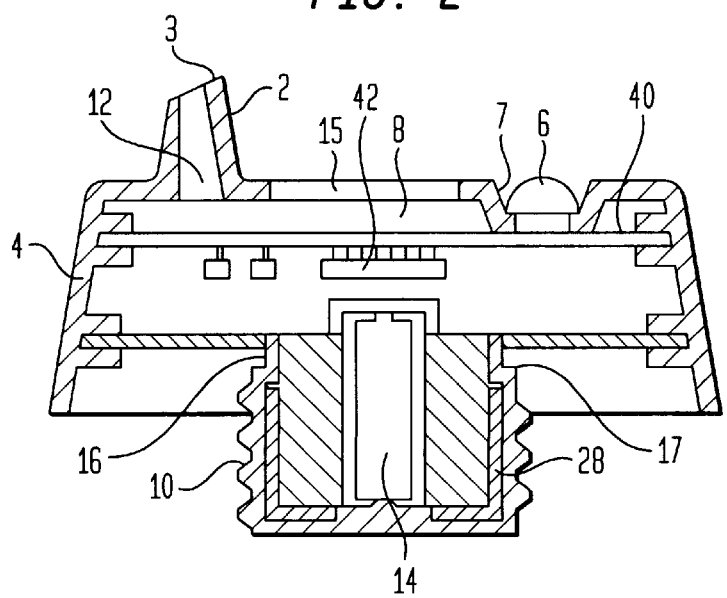
FIG. 2 is a side section view of the present invention
Figure 3:
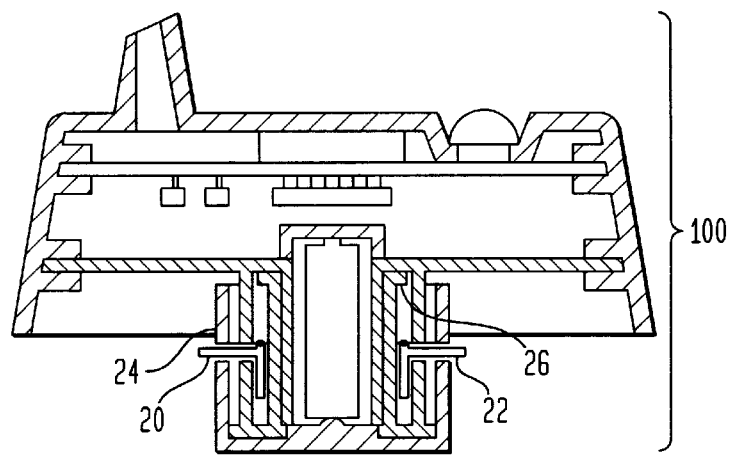
FIG. 3 is a side section view of an alternate embodiment of the present invention.

FIG. 2 shows a side section view of the present invention. Pressure stern 2 is slightly angled at the top 3 to make for an easier application onto a vehicle tire stem as shown on FIG. 4. Liquid crystal display 8 is placed beneath an opening 15 in the top of gas cap body 4. Button 6 protrudes through a second opening 7 in gas cap body 4. Gas cap body 4 is molded of a gas resistant rigid plastic such as ABS or polycarbonate. Printed circuit board 40 supports the display 8 as well as integrated processing circuit 42 which converts the voltage coming from pressure transducer 12 to a numerical value relating to tire pressure. The IC 42 and display 8 are powered by battery 14. Threaded portion 10 is removable by releasing inwardly biased holding tabs 16, 17. This action serves two purposes. One is to act as a battery door and thereby expose the end of battery 14 allowing for its removal. The second function is to allow a different locking means to be substituted such as the one shown in FIG. 3 where a pair of spring loaded locking tabs 20, 22 take the place of a threaded closure. Locking tabs are common means of retaining a gas cap on many current vehicle gas inlets. The locking tabs 20, 22 are uppwardly biased by compression springs 24, 26 which help to hold the tabs 20, 22 snuggly onto the lip of a standard bayonet type gas inlet.

In this way, with the present invention 100, a person can have easy access, to a tire pressure gauge while in the process of pumping gas into his or her vehicle. The amount of time to check the tire pressure is about the same time it takes to fill the vehicle's tank with gas. Therefore a person can accomplish the potentially life saving task of measuring tire pressure while gas is being pumped resulting in a valuable saving of time.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A combination gas cap and digital tire pressure gauge comprising:

a hollow bodied gas cap, a liquid crystal display showing through an opening in the top of said gas gap;

a printed circuit board, support electronics, pressure transducer and battery located within said cap;

a battery door and a push button that activates an associated delay circuit to allow a pressure reading to remain readable for ten seconds;

the top of said hollow bodied gas cap having a raised rectangular portion containing said liquid crystal display and said associated electronics and also acting as a hand tightening means;

said hollow bodied gas cap having a removable bayonet type locking portion on its lower end, said removable bayonet locking type portion designed to mate with a vehicle gas inlet, said removable bayonet locking type portion also acting as said battery door.

2. A gas cap and tire pressure gauge apparatus comprising:

a gas cap body;

a pressure stem means attached to said gas cap body for mating with the vehicle tire stem of a tire;

pressure measuring means communicating with said pressure stem means for measuring the pressure in said tire;

display means attached to said pressure measuring means for displaying the tire pressure measured by said pressure measuring means; and, means for attaching said apparatus to the vehicle gas inlet of a vehicle, wherein said cap may be removed from said vehicle gas inlet and used to measure the pressure of air in said tire of said vehicle and then reattached to said vehicle gas inlet.

3. The apparatus of claim 2 wherein said gas cap body and said pressure stem means are molded from the same material.

4. The apparatus of claim 3 wherein said material comprises a plastic material.

5. The apparatus of claim 2 wherein said gas cap body includes an opening therein and said display means comprises a liquid crystal display visible through said opening.

6. The apparatus of claim 5 wherein said pressure measuring means includes a printed circuit board, support electronics and a pressure transducer located within said gas cap body.

7. The apparatus of claim 6 further including a battery compartment located within said apparatus and a removable door attachable to said apparatus for providing access to said battery compartment.

8. The apparatus of claim 7 further comprising:

a push button located on said gas cap body for activating said pressure measuring means; and, means for permitting a pressure reading to remain readable on said liquid crystal display for at least ten seconds after a pressure reading is taken.

9. The apparatus of claim 2 wherein said means for attaching said apparatus to said vehicle gas inlet comprises threads located on the outside of said apparatus for mating with corresponding threads on said vehicle gas inlet.

10. The apparatus of claim 2 wherein said means for attaching said apparatus to said vehicle gas inlet comprises a bayonet type locking means for selective attachment to said vehicle gas inlet.

* * * * *